United States Patent Office 2,727,916
Patented Dec. 20, 1955

2,727,916
METHOD FOR MAKING STABLE SATURATED FATTY ACIDS

Roger L. Logan, Elkins Park, Pa., assignor to Kessler Chemical Co., Inc., Philadelphia, Pa., a corporation of Pennsylvania No Drawing. Application January 12, 1953, Serial No. 330,923

2 Claims. (Cl. 260—419)

This invention relates to a method for making stable saturated fatty acids.

Commercial saturated fatty acids are produced from naturally occurring fatty oils such as lard, tallow, cottonseed oil and soybean oil. The selected fatty oil can be hydrolyzed to split off glycerine by many commercial processes such as hydrolysis with water at high temperatures and pressures, or with water and catalyst. Another process consists of saponifying the oil with dilute aqueous alkali solution and acidulating with a mineral acid to liberate the formed fatty acids. The glycerine is recovered from the water solution.

The fatty acids which have been split from the oils are usually vacuum distilled and then the saturated acids are separated from the unsaturated acids by a plurality of pressings or, alternatively, the liquid fatty acids are separated from the saturated fatty acids by the use of solvents such as methanol, propane, or acetone.

It is also well known to hydrogenate the fatty oils to convert the liquid fractions, such as the oleates, to saturated fatty materials such as stearates, and then split off glycerine.

It has been found that commerical saturated fatty acids as, for example, stearic acid produced by the heretofore known processes, have the serious limitation of poor color stability above 100° C. and change color on exposure to light. This may be due to the fact that the separation processes do not remove small amounts of impurities such as aldehydes, ketones, amino compounds and mucilages, which have a great effect on the color and color stability at high temperatures of the saturated fatty acids. Redistillation of the saturated fatty acids does not eliminate these compounds, since some of them have vapor pressures as high as the saturated fatty acids.

If saturated fatty acids are used in esterification processes or other chemical processes where they are subjected to high temperatures, the formed ester will be dark in color and not suitable for many purposes.

The color stability, at high temperatures and on exposure to light, of saturated fatty acids produced by known processes mentioned heretofore can be greatly improved by the method in accordance with this invention.

In accordance with this invention a saturated fatty acid, such as stearic or palmitic acid, is gradually added to molten caustic under an inert atmosphere. The soaps formed are cooled and acidulated with mineral acid. The fatty acids liberated are heat and light stable.

If undistilled fatty acids from a crude inedible tallow or animal grease are separated by known processes into saturated and liquid fatty acids, and the saturated fatty acids are treated as described above and then subjected to vacuum distillation, the resulting fatty acids have excellent color and the color is stable even in air at 200° C. This color stability is achieved by the process of this invention even where the crude inedible tallow or animal grease is not subjected to the conventional treatment with sulfuric acid prior to any separation.

More specifically, the method in accordance with this invention is applicable to saturated fatty acids having from 9 to 22 carbon atoms. The method is applicable to such acids in the crude form as found in tallow, cottonseed oil, coconut oil, rape seed oil, fish oil and soybean oil, or in the commercial form.

The caustic may be derived from any of the alkali metals, such as barium, lithium, calcium, sodium or potassium. The hydroxides and oxides of these alkali metals may be used. Due to their low cost, sodium and potassium are preferred.

The inert atmosphere may be, for example, $N_2$, $CO_2$, steam, helium, argon, or any other atmosphere which does not contain oxygen or any other ingredient which will react with the molten soaps. Once started the reaction will supply the water vapor necessary to provide the desired inert atmosphere.

The caustic will be maintained at a temperature between the melting point of the caustic and the temperature just below that at which the saturated fatty acids decompose, i. e., about 475° C.

Any mineral acid may be used to acidulate the formed soaps. Thus, for example, sulfuric, hydrochloric and phosphoric. It is preferred to use the acid in dilute form, for example, as a 25% to 50% aqueous solution. Recovery of the thus treated saturated fatty acid is achieved by neutralizing the fatty acid with respect to the mineral acid used, drying under vacuum and then vacuum distilling.

The following specific examples will further clarify the method in accordance with this invention:

Example 1

500 parts of crude commercial stearic acid containing myristic acid, palmitic acid and stearic acid in the naturally occurring proportions, prepared from a crude brown tallow by hydrolysis and triple pressing was slowly charged over one-half hour to 200 parts of molten sodium hydroxide which was held at 360° C. under an atmosphere of nitrogen. The thus formed soaps were cooled and acidulated with dilute sulfuric acid. The liberated mixture of myristic acid, palmitic acid and stearic acid was neutralized with respect to the sulfuric acid and dried under vacuum and then vacuum distilled at .5 mm. of mercury absolute pressure. The acid mixture had the following analysis:

Iodine No _____ 4.0
Acid No_____ 210

Color lovibond scale 5¼″ tube—
   100° C_____ 2.0 Yellow, .1 Red
   200° C_____ 3.0 Yellow, .2 Red

Example 2

1000 parts of crude stearic acid prepared from a crude brown animal grease by hydrogenation to iodine number 3 was charged gradually over a period of 1 hour and 10 minutes to molten sodium hydroxide which was held at 380° under an atmosphere of nitrogen. The thus formed soaps were cooled and acidulated with dilute hydrochloric acid. The liberated fatty acids were neutralized with respect to the hydrochloric acid and dried under vacuum and then vacuum distilled at .5 mm. of mercury absolute pressure. The stearic acid had an excellent color and none of the usual odor of hydrogenation.

Iodine No_____ 2.5
Acid No_____ 205

Color lovibond scale 5¼″ tube—
   100° C_____ 2.0 Yellow, .1 Red
   200° C_____ 4.0 Yellow, .25 Red

Example 3

1000 parts of commercial stearic acid containing myristic acid, palmitic acid and stearic acid in the naturally occurring proportions, prepared by the liquid propane extraction process, which had the following analysis:

Iodine No _____ 4.5
Acid No _____ 207

Color lovibond scale 5¼" tube—
    100° C _____ 4 Yellow, .5 Red
    200° C _____ 15 Yellow, 1.5 Red was gradually charged, over 1 hour to 350 parts of liquid sodium hydroxide which had been preheated to 330° C. The reaction was held under a blanket of nitrogen. When the addition of stearic acid was complete, the reaction was cooled and the soaps were acidulated with dilute sulfuric acid.

The liberated palmitic acid, myristic acid and stearic acid were neutralized with respect to the sulfuric acid and dried under vacuum and then vacuum distilled at 1 mm. of mercury absolute pressure. The distilled acids had excellent odor and had the following analysis:

Iodine No _____ 3.5
Acid No _____ 206

Color lovibond scale 5¼" tube—
    100° C _____ 2.0 Yellow, 0.0 Red
    200° C _____ 2.0 Yellow, 0.0 Red

Example 4

1000 parts of crude coconut oil fatty acids were gradually charged over 1½ hour period to 350 parts of liquid sodium hydroxide which had been preheated to 360° C. The reaction was conducted under a blanket of nitrogen. When the addition of stearic acid was complete the reaction was cooled and the soaps were acidulated with dilute sulfuric acid. The liberated caproic, caprylic, capric and lauric acids were then neutralized with respect to sulfuric acid and dried under vacuum and then vacuum distilled at 1 mm. of mercury absolute pressure.

The distilled fatty acids had an excellent odor and had the following color analysis:

Color lovibond scale 5¼" tube—
    100° C _____ 5 Yellow, .1 Red
    200° C _____ 6 Yellow, .1 Red

Example 5

1500 parts of hydrogenated fish oils containing $C_{16}$, $C_{18}$ and $C_{22}$ saturated fatty acids were gradually charged over a 2 hour period to 500 parts of liquid sodium hydroxide which had been preheated to 390° C. The reaction was held under a blanket of nitrogen and the water vapor produced from saponification. When the addition of the fatty acids was complete, the reaction was cooled and the soaps were acidulated with 10% hydrochloric acid.

The liberated fatty acids were neutralized with respect to the hydrochloric acid and dried under vacuum and then vacuum distilled at 1 mm. of mercury absolute pressure.

The distilled fatty acids contained stearic acid, palmitic acid and behenic acid. The color lovibond scale was as follows:

Color lovibond scale 5¼" tube—
    100° C _____ 3 Yellow, .1 Red
    200° C _____ 3 Yellow, .1 Red It is not desired to be limited except as set forth in the following claims, the above description being by way of illustration only.

What is claimed is:

1. The step in the process for the preparation of stable saturated fatty acids having from 9 to 22 carbon atoms comprising maintaining caustic in a molten state at a temperature not in excess of about 475° C. and adding an unsubstituted aliphatic saturated acid having from 9 to 22 carbon atoms to the molten caustic under an inert atmosphere, said acid being added to the caustic gradually in small portions.

2. The process for the preparation of stable saturated fatty acids having from 9 to 22 carbon atoms comprising maintaining caustic in a molten state at a temperature not in excess of about 475° C. and adding an unsubstituted aliphatic saturated acid having from 9 to 22 carbon atoms to the molten caustic under an inert atmosphere, said acid being added to the caustic gradually in small portions, cooling the reaction mass and acidulating the thus cooled mass with a mineral acid.

References Cited in the file of this patent

UNITED STATES PATENTS

| | | |
|---|---|---|
| 2,341,239 | Percy et al. | Feb. 8, 1944 |
| 2,492,940 | Schmidt et al. | Dec. 27, 1949 |
| 2,545,126 | Whitney | Mar. 13, 1951 |
| 2,614,122 | Mikeska | Oct. 14, 1952 |